Note: When channel "A" is the active channel as above, G ≡ 1 holds $e_B' \equiv e_A'$

United States Patent Office 3,538,416
Patented Nov. 3, 1970

3,538,416
HIGH RESOLUTION FREQUENCY TO VOLTAGE CONVERTER
Ralph C. Baker, 22 Mayo Ave., Ottawa 12, Ontario, Canada; Douglas N. Davis, 740 Springland Drive, Ottawa, Ontario, Canada; Leon Bronstein, 5772 Blossom, Cote St. Luc, Quebec, Canada; and John A. Lowe, 3605 McCarthy, St. Laurent, Quebec, Canada
Filed Oct. 8, 1968, Ser. No. 765,901
Int. Cl. H02m 7/00
U.S. Cl. 321—6        6 Claims

ABSTRACT OF THE DISCLOSURE

A frequency to voltage converter capable of covering a wide frequency range, for example from 100 to 350 kHz. with a resolution of 0.05 Hz. without introducing transients into the output of the frequency to voltage converter and without loss of resolution. A pair of interlocking frequency/voltage ramps are generated and switch circuits are provided to prevent the ramps from reacting the upper or lower limit and introducing a large transient in the output.

---

Figure 1:
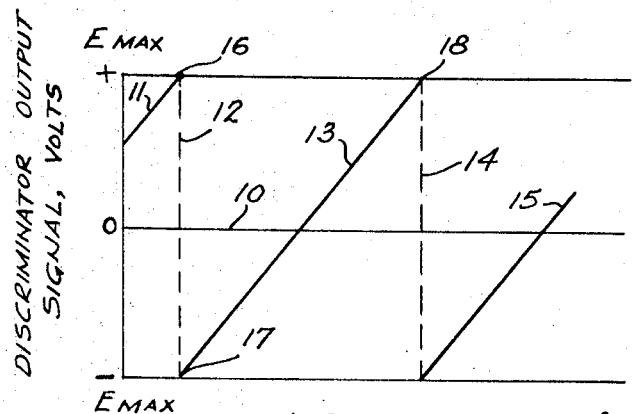

The present invention relates to frequency to voltage converters and in particular to a frequency to voltage converter having a very high resolution and capable of following small changes of frequency which may occur during a slow drift of frequency covering a very wide range.

The frequency to voltage converter of the present invention has particular application to the field of airborne geomagnetic surveying. The frequency to voltage converter of the present invention may be used as a read out device for a total field magnetometer such as a rubidium vapour resonance type magnetometer which produces an output frequency which is very closely proportional to the ambient magnetic field at the magnetometer. In the use of such magnetometers especially for airborne surveying a very wide dynamic range of frequencies is encountered and it is desired to follow small changes in frequencies without regard to the slowly varying component of output frequency. For example, in airborne geomagnetic surveying, magnetic fields ranging from 20 microtesla to 70 microtesla or more are encountered. With a rubidium vapour magnetometer using rubidium 85 this magnetic field change will cause a change in output frequency of from approximately 100 kHz. to 350 kHz. Frequently it is desired to measure the magnetic field to 0.01 nanotesla or better which is an equivalent frequency resolution of 0.05 Hz. Thus a frequency to voltage converter for use with such a magnetometer must be capable of following a frequency change of from 100 to 350 kHz. and to resolve to 0.05 Hz.; this representing 1 part in 7,000,000.

U.S. Pats. 3,242,435 of Mar. 22, 1966 and 3,290,600 Dec. 6, 1966 in the name of L. Malnar disclose wide band discriminators utilizing a delay line and phase sensitive demodulators to compare the delayed and undelayed signals. The slopes of the output voltages are alternately positive and negative depending on the relative phase of the delayed and undelayed signals as frequency increases and thus the phase of the discriminator output is dependent upon which slope the discriminator is working on. Thus although Malnar et al. disclose wide band discriminators which are capable of accurate resolution of small frequency changes, large transients will be introduced into the output signals as the input frequency varies over a large dynamic range, especially during any attempt to rezero the output voltage.

In many applications it is desired to produce a voltage output which faithfully represents or follows changes in frequency. Very frequently this faithful reproduction of the input frequency varies slowly over a large dynamic range. In order for useful output information to be obtained the output voltage must not contain any steps, transients or noise pulses due to the operation, adjustment, or rezeroing of the discriminator; but it must follow all real changes in the frequency being measured. There is no known equipment existing prior to the present invention which is capable of providing this operation. The dynamic range of discriminators with a resolution of 0.05 Hz. or better is approximately 3,000 Hz. An exceptionally good quality discriminator of known type capable of a resolution of 0.05 Hz. might perhaps have a range as great as 10,000 Hz. If wider ranges are attempted the noise level will increase above 0.05 Hz. equivalent.

Utilizing known discriminators of desired resolution to cover a range of from 100 kHz. to 350 kHz. would require a local oscillator/mixer having approximately 100 steps each ranging over about 3 kHz. Each step would mean a new frequency from the local oscillator which would have to have a bank of crystals for controlling its frequency or other circuits to synthesize the many local oscillator frequencies required. It will be appreciated that each change of frequency of such a local oscillator would introduce a transient into the analogue voltage output and this transient would seriously disturb any following filters.

The present invention provides a frequency to voltage converter which is capable of covering the frequency range from 100 to 350 kHz. with a resolution of 0.05 Hz. without introducing transients into the output of the frequency to voltage converter and without loss of resolution. Such a frequency to voltage converter comprises an input terminal to which the variable frequency signal is supplied, a squaring amplifier, delay lines and a gating circuit. The squaring amplifier is connected to the output to square the signal, and the output of the squaring amplifier is applied to the delay line and to the gating circuit. The output of the delay line is also applied to the gating circuit. The gating circuit has an output which is gated on by a rising output from the delay line and gated off by a falling output from the squaring amplifier, and changes in this output are proportional to changes in frequency of the signal.

Figure 2:
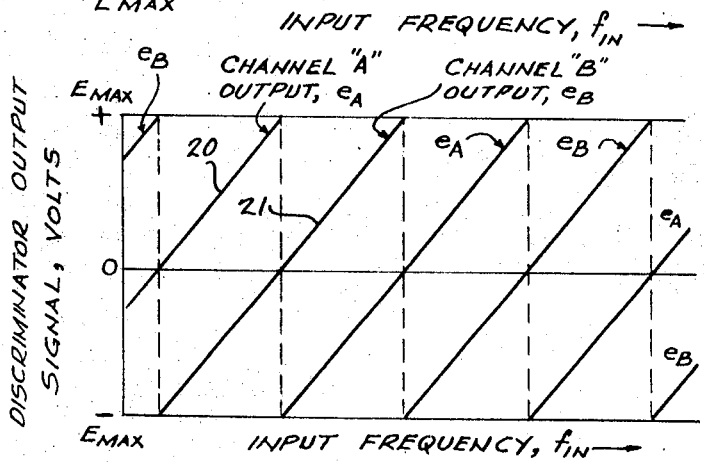
Figure 3:
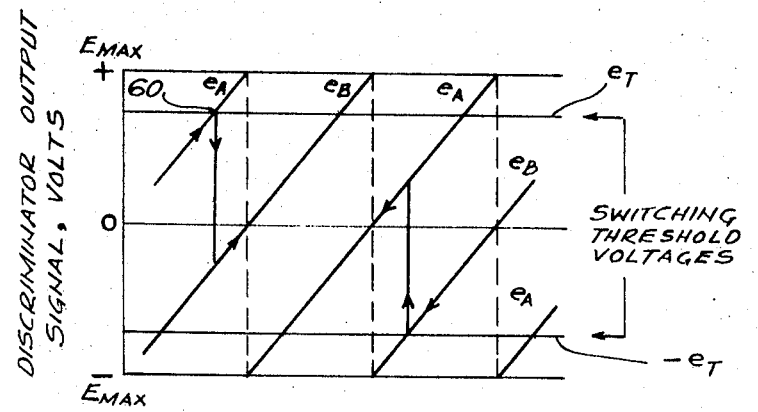
Figure 3:
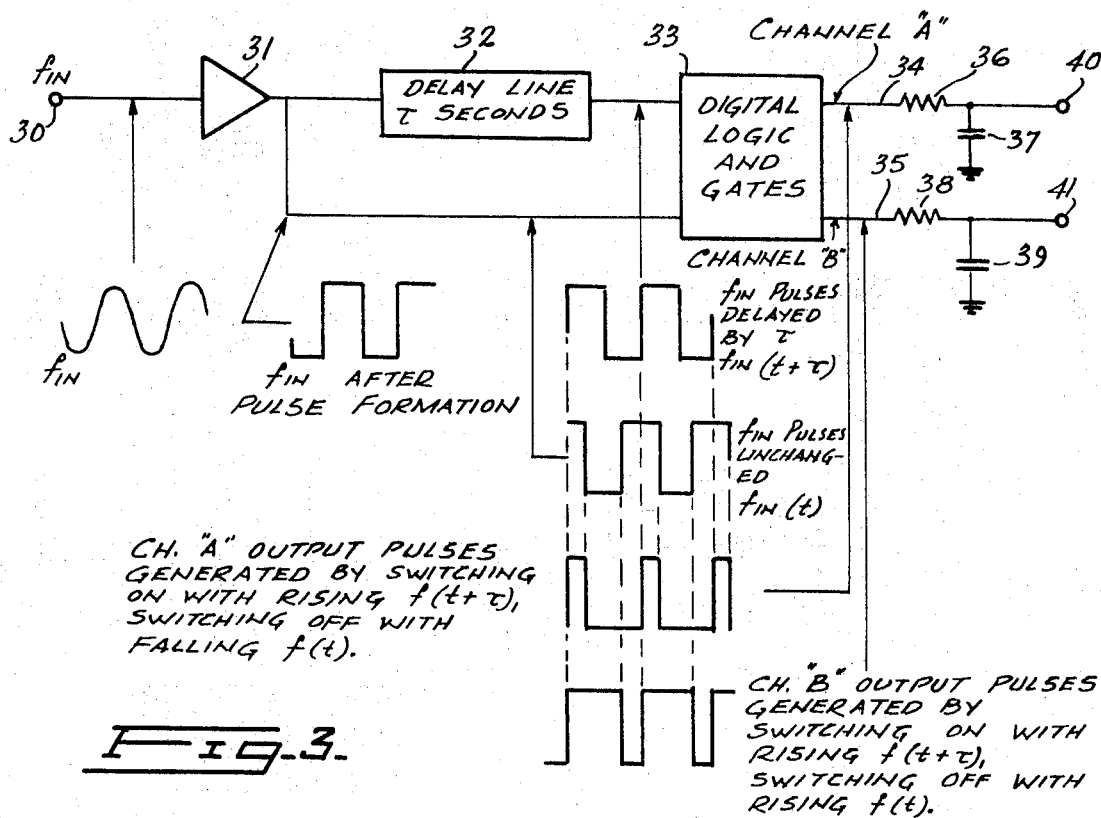
Figure 4:
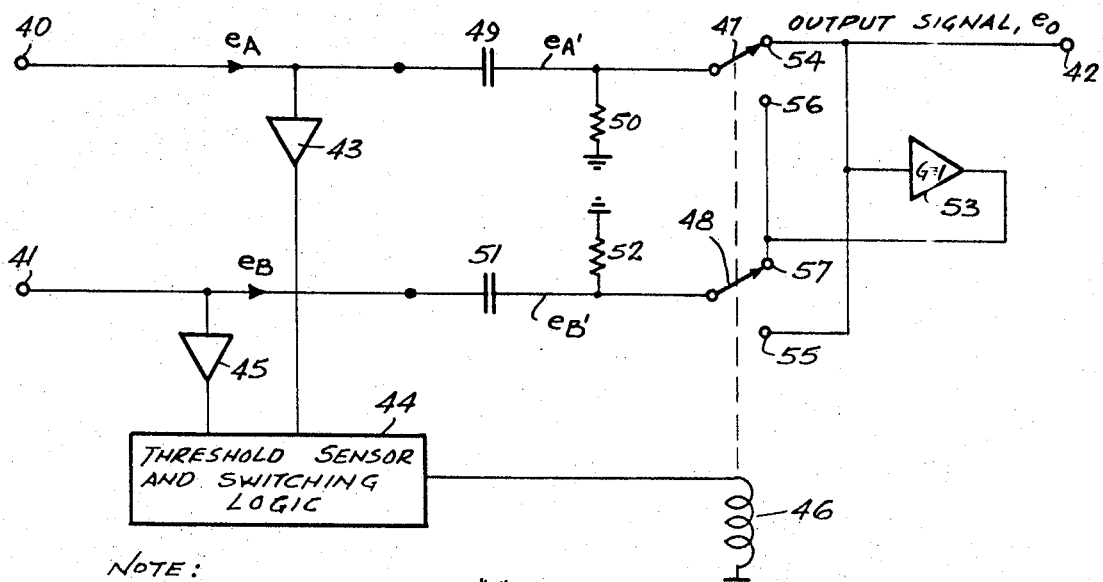
Figure 6:
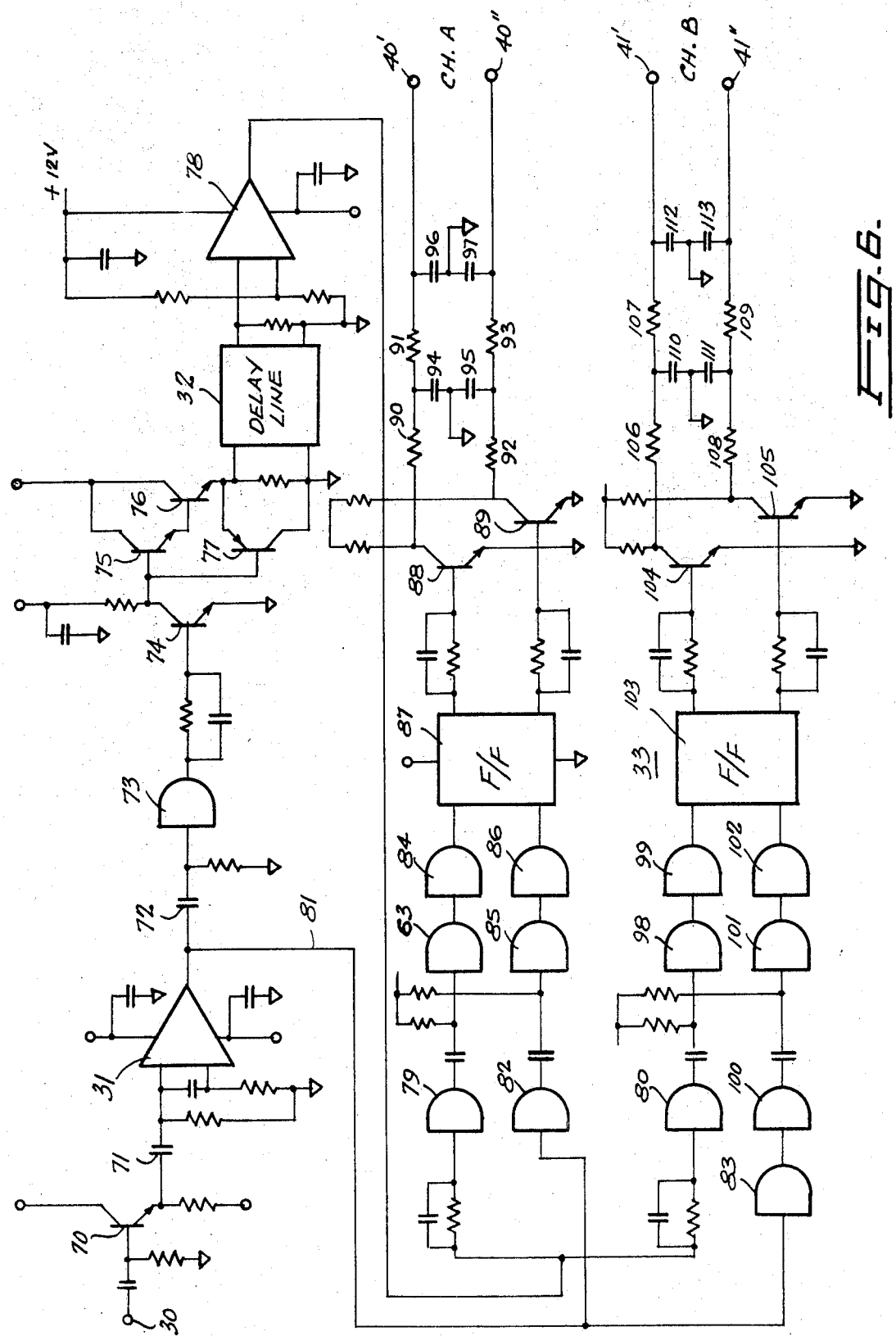
Figure 7:
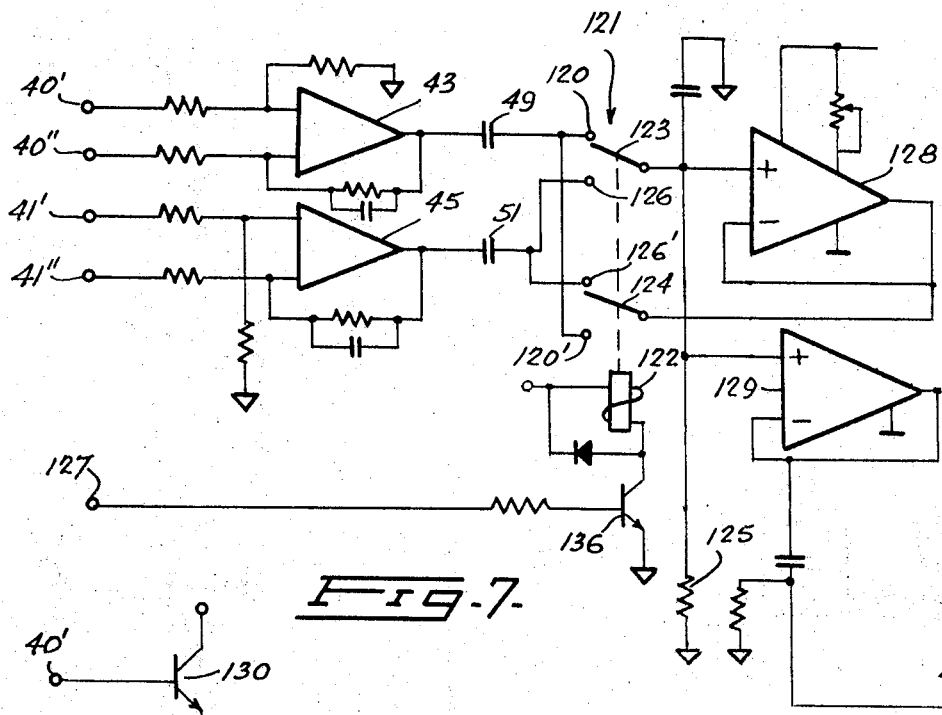
Figure 8:
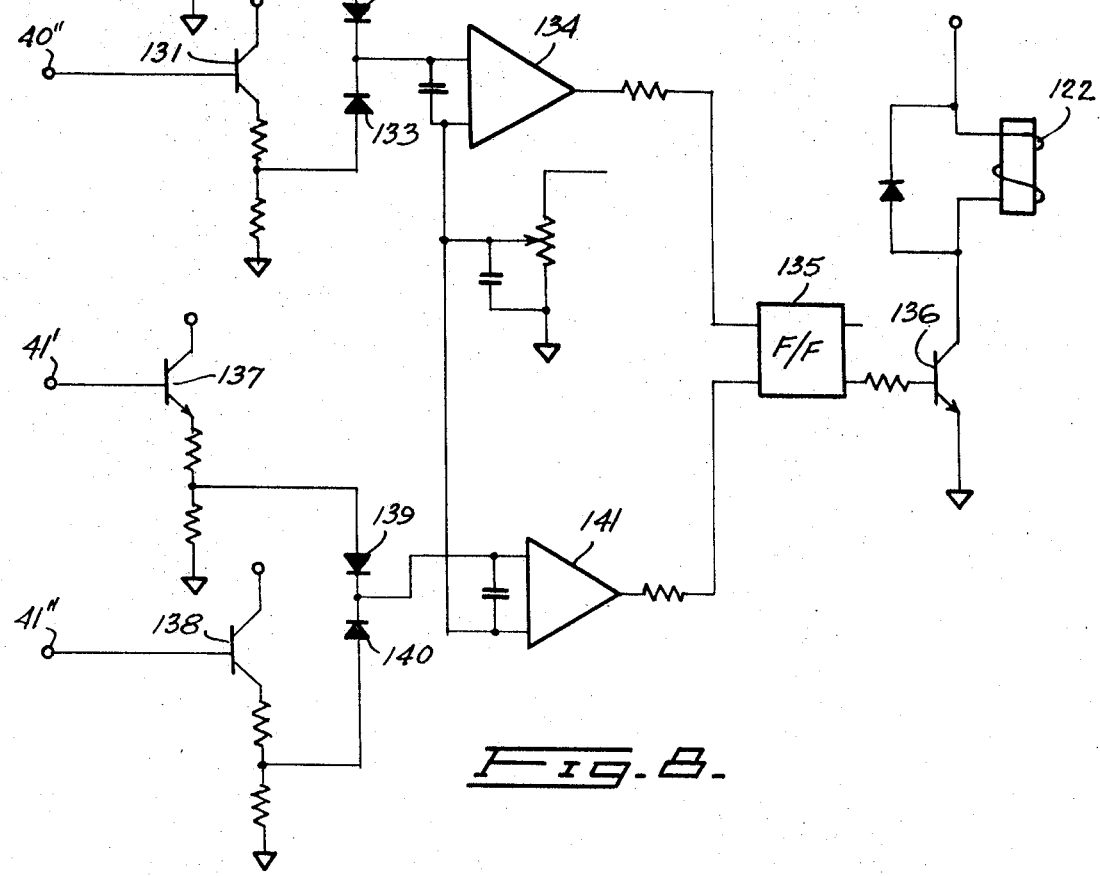

In the accompanying drawings which illustrate the construction and operation of circuits in accordance with the present invention;

FIG. 1 is a graph showing discriminator output voltage vs. input frequency for one channel of a delay line discriminator of the present invention, FIG. 2 illustrates the output voltage vs. frequency for both channels of a delay line discriminator of the present invention, FIG. 3 is a block diagram of a portion of the delay line discriminator of the present invention, FIG. 4 is a block diagram of the output section of the discriminator of the present invention, FIG. 5 which is on the same sheet of drawings as FIGS. 1 and 2 is a graph of output voltage vs. frequency illustrating the operation of the discriminator of FIGS. 3 and 4, FIG. 6 is a schematic diagram of a portion of a frequency to voltage converter of the present invention corresponding to the block diagram of FIG. 3, FIG. 7 is a schematic diagram of the output portion of a frequency to voltage converter of the present invention, and FIG. 8 is a schematic diagram of the threshold sensor and switching logic circuit.

FIG. 1 is a graph of voltage vs. frequency for one channel of a discriminator in accordance with the present invention. A zero line 10 represents the zero output voltage from one channel of a discriminator whose output voltage is represented by the lines 11, 12, 13, 14 and 15. The line 11 illustrates the output voltage increasing toward $E_{max.}$ and on reaching the voltage $E_{max.}$ at the point 16 the output is shown by the dotted line 12 as decreasing to a value $-E_{max.}$ at the point 17. The voltage continues to increase from the point 17 linearly as shown by the line 13 to the point 18 where the voltage then reverts to $-E_{max.}$ as shown by the dotted line 14 and again increases as shown by the line 15. It will be appreciated that the graph of FIG. 1 serves to illustrate the operation of one channel of the frequency to voltage converter of the present invention. Such a frequency to voltage characteristic may be obtained using a delay line discriminator in which the input signal has been passed through a squaring amplifier so that the input is in pulse form, the delayed and undelayed inputs are fed to a gating circuit and the pulse output of the gating circuits is smoothed in an integrator. Circuits capable of providing a frequency to voltage characteristic as illustrated in FIG. 1 will be detailed hereinafter. For this part of the description of the invention it will be sufficient to note that the present invention embodies such frequency to voltage converters.

FIG. 2 illustrates the output voltages obtained with increasing input frequency for a delay line discriminator which has two outputs that are gated by different edges of the input pulses to the disariminator. It will be noted that the output of channel A, $e_A$, reaches its maximum value when the output of channel B, $e_B$, is substantially zero. The utility of these interlocking ramp voltages will be more fully explained with reference to the succeeding figures of the drawings.

FIG. 3 illustrates in simplified form a portion of a discriminator or frequency to voltage converter constructed in accordance with the present invention. Wave shapes have been shown at various points on the block diagram in order to clarify an understanding of the invention. An input whose frequency is $f_{in}$ is applied at terminal 30. This input is passed to the squaring amplifier 31 where the input voltage is formed into a pulse wave form. The output from the squaring amplifier 31 is passed through a delay line 32 to digital logic AND gates 33 and also directly from the squaring amplifier 31 to the digital logic AND gates 33. Two outputs are obtained from the digital logic AND gates, channel A and channel B, channel A being obtained on the line 34 and the channel B on the line 35. An integrator consisting of resistor 36 and capacitor 37 is connected to the line 34 for smoothing the pulse output from the digital logic gates. Similarly an integrator consisting of resistor 38 and a capacitor 39 is connected to the line 35 for smoothing the output pulses from the digital logic AND gates 33 on channel B. The output at terminal 40 and at terminal 41 is in the form of a voltage which is variable and which varies directly in proportion to changes in input frequency $f_{in}$ applied at terminal 30. In fact the outputs obtained at terminals 40 and 41 correspond to the curves 20 and 21 illustrated in FIG. 2.

The frequency to be measured, $f_{in}$, in FIG. 3 is amplified and turned into square waves or pulses, and then sent through two paths, one unaltered into the digital logic gates, and the other delayed by a fixed time τ seconds, for example 500 microseconds. Delayed times of from 50 microseconds to 3,000 microseconds have been successfully employed in this circuit. The voltage of channel A on line 34 is produced by arranging the logic AND gates 33 to turn on when the delayed pulses are rising, and to switch off when the undelayed pulses are falling, and then smoothing the resultant pulses through the integrator consisting of resistor 36 and capacitor 37 to provide a variable voltage at the output terminal 40. Similarly, the voltage of channel B appearing on line 35 is produced by arranging the logic circuits 33 to switch on when the delayed pulses are rising and switch off when the undelayed pulses are rising. The output on line 35 is also passed through the integrator consisting of resistor 39 and capacitor 40 to give a variable voltage at the terminal 41. Thus the voltages at the terminals 40 and 41 are directly frequency dependent.

For many applications, small changes in frequency must be measured but the gross absolute value is not required. That is, it is not necessary to follow the output voltages up to $+E_{max.}$ (FIG. 1) as frequency rises or down to $-E_{max.}$ as frequency decreases. The output voltages of interest are only very small undulations occurring between these two values. The normal analogue technique for emphasising these small fluctuating signals is to follow the output with a high pass filter which rejects low frequency and DC signals. If however, the output of channels A and B appearing at terminals 40 and 41 of FIG. 3 were to be fed into high pass filters the discontinuities caused by the voltage output on the channel stepping from $+E_{max.}$ to $-E_{max.}$ would cause a transient in the filter output which would take considerable time to settle down. For reasonable values of frequency change encountered in the operation of rubidium vapour magnetometers in airborne installations, the magnetic field change encountered, and thus the frequency variation encountered, is sufficiently great that transients would occur often enough to completely destroy small variations in frequency which are the important data to be recorded.

The circuit of FIG. 4 provides a means for eliminating these transients to provide an output signal $e_o$ which is proportional to the input frequency $f_{in}$ applied at terminal 30 of FIG. 3. Referring to FIG. 4 the output signal $e_o$ at terminal 42 is proportional to $f_{in}$ for high frequency fluctuations in $f_{in}$ and is proportional to $df_{in}/dt$ for low frequency fluctuations in $f_{in}$. The transition between flat response and $df_{in}/dt$ response depends upon the time constants of the circuit. The input of channel A at terminal 40 is fed to a buffer amplifier 43 and from the buffer amplifier 43 to the threshold sensor and switching logic circuit 44. Similarly the input on channel B at terminal 41 is fed through the buffer amplifier 45 to the threshold sensor and switching logic 44. The threshold sensor and switching logic circuit 44 provides an output to energize the relay coil 46 having a pair of moveable contacts 47 and 48 which are ganged for simultaneous motion on energization of the relay coil 46. The input at terminal 40 is also fed through the time constant circuit consisting of the capacitor 49 and a resistor 50 to the moveable contact 47 and the input at terminal 41 is fed to an identical time constant circuit consisting of the capacitor 51 and the resistor 52 to the moveable contact 48. An amplifier 53 whose gain is very closely equal to unity has its input connected to the fixed contacts 54 and 55 of the relay and has its output connected to the contacts 56 and 57 of the relay. As shown in FIG. 4 the contacts 56 and 57 are connected together and the contacts 54 and 55 are also connected together and to the output terminal 42.

The threshold sensor and switching logic circuit 44 causes the relay 46 to switch the output of the amplifier 53 from channel A to channel B and back according to the voltages applied at input terminals 40 and 41 as illustrated in the graph of FIG. 5. When the output voltage $e_A$ of channel A increases to a predetermined threshold voltage $e_T$ which is determined by the setting of the threshold sensor and switching logic circuit 44 during a frequency rising situation, the input to the amplifier 53 is switched from channel A to channel B. This switching causes no transient in the output voltage $e_o$ appearing at terminal 42 because prior to switching the voltage of channel B, $e_B'$ was held exactly equal to the voltage of channel A, $e_A'$, and following channel A's fluctuations by the unity gain amplifier 53. As the voltage $e_A$ of channel A neared the threshold voltage $e_T$ as shown at 60 in FIG. 5 and threatened to produce a transient in the output voltage of channel A, the output and control is switched from channel A to channel B and now the amplifier 53 holds the voltage $e_A'$ of channel A exactly equal to the voltage $e_B'$ on channel B. Similarly in a decreasing frequency situation when the voltage on channel B, for example, reaches the lower threshold voltage $-e_T$ at point 61, the threshold sensor and switching logic circuit 44 actuates the relay 46 and control of the amplifier and the output provided to the terminal 42 is switched to channel A. Since the output voltage from both channels is prevented from reaching the knee in the output characteristic curves of the two channels of the frequency to voltage converter, substantially no unwanted fluctuations in the output voltage are encountered regardless of the overall drift of frequency. It will be appreciated that switching control of the threshold sensor and switching logic circuit 44 comes from the voltages $e_A$ and $e_B$; but the output voltage at terminal 42 $e_A'$ and $e_b'$ are different from the voltages $e_A$ and $e_B$, because capacitors 49 and 51 separate the output side of the circuit of FIG. 4 from the input side.

FIG. 6 is a schematic diagram of a circuit in accordance with the block diagram of FIG. 3 showing a circuit used in an operating example of the invention. An input $f_{in}$ is applied at terminal 30 and is passed through a squaring amplifier 31, the output of which is passed through pulse shaping circuits to a delay line 32. The output of the delay line 32 and the undelayed output from the squaring amplifier 31 are then passed through digital logic AND gates and integration circuits to the output terminals 40', 40" and 41' and 41".

The input $f_{in}$ at terminal 30 is amplified by the NPN transistor 70 the output from its emitter being fed via capacitor 71 to the packaged squaring amplifier 31 which is a Fairchild μL710 manufactured by Fairchild Manufacturing Company which serves as a squaring amplifier to square all pulses appearing at its input terminal. This output is then passed through the capacitor 72, to the amplifier 73 which is one half of a Fairchild μL914 which is an integrated circuit dual NAND/NOR gate, only one half being used as an amplifier in the present instance. The output from the amplifier 73 is then fed to the pulse shaping circuit consisting of the transistors 74, 75, 76, and 77 the output of which is applied to the delay line 32. The delay line 32 is a Corning Glass Company Code #8454146 glass digital delay line. The output from the delay line 32 is then fed to the output amplifier 78 whose output is applied to amplifiers 79 and 80. Simultaneously the undelayed output from the amplifier 31 is fed via the line 81 to the amplifiers 82 and 83. The inputs to amplifiers 79 and 82 are amplified and fed through successive amplifiers 63, 84, 85 and 86 to the flip flop circuit 87, the flip flop 87 being turned on by the output of the amplifier 84 and turned off by the output of the amplifier 86. The output from the flip flop 87 is fed to the transistors 88 and 89 and to an integrator consisting of resistors 90, 91, 92 and 93 and capacitors 94, 95, 96 and 97 which together form an integrator having a time constant of 2 milliseconds. The output from the integrator is fed to the output terminals 40' and 40".

The inputs to the amplifiers 80 and 83 are fed through the amplification and pulse shaping chains consisting of amplifiers 98, 99, 100, 101 and 102 to a flip flop 103 which operates as a phase comparator. It will be noted that there are 4 amplifiers 83, 100, 101 and 102 in the lower train of pulse shaping amplifiers whereas there are three amplifiers 80, 98, and 99 in the upper train of pulse shaping amplifiers feeding the flip flop 103. The extra amplifier which, in fact, is the amplifier 83 performs a phase inversion function so that the flip flop 103 can be turned on and off by the appropriate phase of the input signals to the phase comparator. The flip flop 103 is turned on by the output from the amplifier 99 and is turned off by the output from the amplifier 102. The output from the flip flop 103 is fed to transistors 104 and 105 which drive a two second integrator consisting of resistors 106, 107, 108 and 109 and capacitors 110, 111, 112 and 113. With the circuit constructed as shown in FIG. 6 the output pulses from the flip flop 87 which are integrated to form the output voltage of channel A are generated by switching on the flip flop 87 with a rising voltage from the output of the delay line and switching off the flip flop 87 with a falling voltage on the line 81. Correspondingly the channel B flip flop 103 is turned on by a rising wave front from the delay line output and switched off with a rising undelayed output. The amplifier 83 is the other half of the dual integrated circuit used for the amplifier 73. The flip flops 87 and 103 are Fairchild μL902 circuits. The amplifiers 79 and 82 are respectively each one half of a μL914. Similarly amplifier pairs 63 and 85, 84 and 86, 80 and 100, 98 and 101, and 99 and 102, are formed from μL914 integrated circuits. The delay line 32 is a special model with low internal reflections to decrease noise generated by the unwanted reflected pulses arriving at the output at a time other than τ seconds after introduction to the delay line. If these reflected pulses cause noise, the effect can be substantially reduced by frequency modulating the input ($f_{in}$ to 31) or causing the output of 31 to be FM'd by varying the reference voltage of 31 in a sinusoidal fashion as long as $f_{in}$ is of sine wave character. The frequency of modulation should be higher than the cutoff frequency of the low pass filters following the digital logic 33.

If greater reliability of triggering is required, the differentiating networks preceding amplifiers 73, 83, 85, 98 and 101 may be replaced with one-shot (monostable) multivibrators operating with a pulse width of approximately 100 nanoseconds, the use of such multivibrators would render the amplifiers 83, 84, 85, 86, 98, 99, 101 and 102 redundant.

FIG. 7 is a schematic diagram of an operating embodiment of the block diagram of FIG. 4 without the threshold sensor and switching logic 44 which apparatus is illustrated in FIG. 8. The channel A input at terminals 40', 40" is fed to a differential amplifier 43 and to a buffer amplifier which is formed of a pair of emitter followers shown as 130 and 131 in FIG. 8. The signal from amplifier 43 is then fed via capacitor 49 to the terminals 120 and 120' of relay 121 having a coil 122 and moveable contacts 123 and 124. In FIG. 7 the resistors 50 and 52 of FIG. 4 have been replaced by a single resistor 125. The channel B input at terminals 41' and 41" is fed to the differential amplifier 45 and to the buffer amplifier which is formed of emitter followers 137 and 138 in FIG. 8. The signal from amplifier 45 is fed through the capacitor 51 to the fixed terminals 126 and 126' of the relay 121. The relay 121 has its coil 122 connected to the threshold sensor and switching logic circuits of FIG. 8 via the terminal 127. The amplifier 128 which is a high input impedance analogue computer operational amplifier is wired in a unity gain follower configuration, equivalent to the amplifier 53 of FIG. 4. The signal is fed to terminal 42 through the isolating amplifier 129. The input of amplifier 128 is connected to the moveable contact 123 of the relay 121 and the output of amplifier 128 is connected to control the voltage level of the channel A or channel B output by the moveable contact 124 of the relay 121.

Referring to FIG. 8 there is shown the threshold sensor and switching logic circuit illustrated in block form in FIG. 4. The input at the terminals 40' and 40" is fed through the buffer amplifiers consisting of transistors 130 and 131 to the diodes 132 and 133 and to the voltage comparator circuit 134 which is a Fairchild μL710 integrated circuit voltage comparator identical to 31. They are essentially a high gain differential input amplifier operating in an open loop configuration. When the voltage at one terminal becomes more positive than the reference on another terminal, the difference is amplified by the gain (typically several thousand) to produce a much larger voltage change on the output terminal and cause the flip flop 135 to change to, or remain in the proper state. One output of the flip flop 135 is connected to the transistor 136 which is in series with the coil 122 of the relay 121. It should also be noted that the transistor 136 is also shown on FIG. 7 of the drawings.

Similarly the output from channel B at terminals 41' and 41" is fed via the buffer amplifier consisting of transistors 137 and 138 to the diodes 139 and 140 and to the comparator circuit 141 which effects a voltage comparison between the output voltage of channel B and a reference voltage and provides an output to drive the flip flop 135.

The discriminator illustrated schematically in FIGS. 6, 7 and 8 has a dynamic range from 100 to 350 kHz. and is capable of resolving frequency changes as small as 0.05 Hz. throughout the entire frequency range. The transient eliminator section of the present invention enables a transient-free uninterrupted output to be obtained following small frequency changes in the input without in any way masking these changes.

To date signals of 0.002 nanotesla have been resolved in the frequency range of 0.02 to 1.0 Hz. while the ambient magnetic field changes by as much as 5 nanotesla per second with the circuits described using a 500 microsecond delay line, commercial capacitors and operational amplifiers for the amplifier 53. Larger rates of change of magnetic field can undoubtedly be accommodated with the circuit of the present invention but tests have not as yet been conducted under such conditions.

We claim:

1. A frequency to voltage converter for resolving small changes in the frequency of a signal supplied to said converter comprising an input terminal to which said signal is supplied, a squaring amplifier connected to said input to square said signal, the output of said squaring amplifier being applied to a delay line and to a gating circuit, the output of said delay line also being applied to said gating circuit, said gating circuit having an output which is gated on by a rising output from said delay line and gated off by a falling output from said squaring amplifier, changes in said output being proportional to changes in frequency of said signal.

2. A frequency to voltage converter as claimed in claim 1 and further comprising an integrator connected to the output of said gating circuit.

3. A frequency to voltage converter for resolving small changes in the frequency of a signal supplied to said converter comprising an input terminal to which said signal is supplied, a squaring amplifier connected to said input terminal to square said signal, the output of said squaring amplifier being applied to a delay line and to a gating circuit, the output of said delay line also being applied to said gating circuit, said gating circuit having two outputs, the first output of said gating circuit being gated on by a rising output from said delay line and being gated off by a falling output from said squaring amplifier, the second output of said gating circuit being gated on by a rising output from said delay line and gated off by a rising output from said squaring amplifier, changes in said first and second outputs being proportional to changes in frequency of said signal.

4. A frequency to voltage converter as claimed in claim 3, and further comprising an integrator connected to each output of said gating circuit.

5. A frequency to voltage converter for providing an output voltage which is the analogue of an input frequency for high frequency fluctuations in frequency and is proportional to the derivative of input frequency with respect to time for low frequency fluctuations in input frequency, comprising:

an input terminal, to which an input signal is applied,
a squaring amplifier connected to said input terminal to square the input signal,
a delay line,
a gating circuit, the output from said squaring amplifier being connected to said delay line and to said gating circuit, said gating circuit providing two outputs, the first output of said gating circuit being gated on by a rising output from said delay line, and being gated off by a falling output from said squaring amplifier, the second output of said gating circuit being gated on by a rising output from said delay line and gated off by a rising output from said squaring amplifier,
first and second integrators, said first integrator being connected to the first output of said gating circuit, and the second integrator being connected to the second output of said gating circuit,
a first capacitor having one terminal connected to the output of said integrator, and a second terminal connected to a first input terminal of a switching circuit, and a second capacitor having one terminal connected to the output of said second integrator and a second terminal connected to a second input of said switching circuit,
said switching circuit having a third input, a first and a second output and a control input, and on receipt of a signal at said control input to connect said first or said second input to said first and second outputs, to connect said third input to said second or first input respectively,
a unity gain amplifier connected from said second output to said first input, and
a control circuit connected to the outputs of said first and second integrators to predict the production of an unwanted transient in the first output of said switching circuit and to supply a signal to said control input of said switching circuit to cause said switching circuit to connect the other of said first and second inputs to said first and second outputs.

6. Apparatus as claimed in claim 5 wherein said switching circuit comprises a relay.

References Cited

UNITED STATES PATENTS

| 2,557,581 | 6/1951 | Triman | 324—85 XR |
| 2,863,117 | 12/1958 | Graustein | 324—85 |
| 2,913,579 | 11/1959 | Avins | 329—178 XR |
| 3,242,435 | 3/1966 | Malner et al. | 329—136 |
| 3,290,600 | 12/1966 | Malner | 325—345 |
| 3,407,358 | 10/1968 | Ott | 329—50 |

WILLIAM M. SHOOP, Jr., Primary Examiner

U.S. Cl. X.R.

321—60; 325—345; 329—167